(12) United States Patent
Hou et al.

(10) Patent No.: US 10,371,859 B2
(45) Date of Patent: Aug. 6, 2019

(54) METHOD FOR SIMULATION OF MICROSCOPIC FLOW OF PRE-CROSSLINKED GEL SUSPENSION LIQUID IN POROUS MEDIUM

(71) Applicant: CHINA UNIVERSITY OF PETROLEUM (EAST CHINA), Shandong (CN)

(72) Inventors: Jian Hou, Shandong (CN); Kang Zhou, Shandong (CN); Yongge Liu, Shandong (CN); Qingjun Du, Shandong (CN); Bo Yu, Shandong (CN)

(73) Assignee: CHINA UNIVERSITY OF PETROLEUM (EAST CHINA), Shandong (CN)

( * ) Notice: Subject to any disclaimer, the term of this patent is extended or adjusted under 35 U.S.C. 154(b) by 0 days.

(21) Appl. No.: 15/989,861

(22) Filed: May 25, 2018

(65) Prior Publication Data
US 2018/0341727 A1    Nov. 29, 2018

(30) Foreign Application Priority Data
May 27, 2017   (CN) .......................... 2017 1 0387669

(51) Int. Cl.
    *G01V 99/00* (2009.01)
    *G06F 17/50* (2006.01)
    *G01V 11/00* (2006.01)
(52) U.S. Cl.
    CPC ........... *G01V 99/005* (2013.01); *G01V 11/00* (2013.01); *G06F 17/5009* (2013.01); *G01V 2210/645* (2013.01); *G06F 2217/16* (2013.01)
(58) Field of Classification Search
    CPC ........... G06F 17/5009; G06F 2217/16; G01V 99/005; G01V 11/00; G01V 2210/645
    (Continued)

(56) References Cited

U.S. PATENT DOCUMENTS

2017/0068797 A1* 3/2017 Sharma ............... A61B 5/02007
2017/0337327 A1* 11/2017 Yu ............................ G06T 7/11

FOREIGN PATENT DOCUMENTS

CN        106598912 A   *  4/2017

OTHER PUBLICATIONS

Maillet, J-B., and Peter V. Coveney. "Two-dimensional hydrodynamic lattice-gas simulations of binary immiscible and ternary amphiphilic fluid flow through porous media." Physical Review E 62.2 (2000). pp. 2898-2913. (Year: 2000).*

(Continued)

*Primary Examiner* — Kamini S Shah
*Assistant Examiner* — John E Johansen
(74) *Attorney, Agent, or Firm* — Calfee, Halter & Griswold LLP

(57) ABSTRACT

Disclosed is a method for simulation of a microscopic flow of pre-crosslinked gel suspension liquid in a porous medium, including the steps of: establishing a simulation area of the porous medium based on a two-dimensional core CT slice image and subjecting the simulation area to numerical grid discretization; setting initial position and original shape of pre-crosslinked gel particles to generate virtual boundary mark points; marking the type of numeric grid nodes; calculating the force of the fluid on each virtual boundary mark point according to the momentum change of the numerical grid nodes on the boundary of the pre-crosslinked gel particles; calculating the contact force on each virtual boundary mark point using a particle contact action model; calculating the bending recovery force and the stretching recovery force for each virtual boundary mark point based on the current shape and original shape of the pre-crosslinked gel particles; and calculating the velocity and displacement of each virtual boundary mark point based on Newton's second law, wherein the respective virtual (Continued)

boundary mark points are connected to obtain the overall shape and position of the pre-crosslinked gel particles.

6 Claims, 2 Drawing Sheets

(58) Field of Classification Search
USPC .................................................... 703/2, 10
See application file for complete search history.

(56) References Cited

OTHER PUBLICATIONS

Han, K., Y. T. Feng, and D. R. J. Owen. "Coupled lattice Boltzmann and discrete element modelling of fluid-particle interaction problems." Computers & structures 85.11-14 (2007). pp. 1080-1088. (Year: 2007).*

Zhou, Kang, et al. "An efficient LBM-DEM simulation method for suspensions of deformable preformed particle gels." Chemical Engineering Science 167 (2017). pp. 288-296. (Year: 2017).*

Dasgupta, Gautam. "Integration within polygonal finite elements." Journal of Aerospace Engineering 16.1 (2003). pp. 9-18. (Year: 2003).*

* cited by examiner

METHOD FOR SIMULATION OF MICROSCOPIC FLOW OF PRE-CROSSLINKED GEL SUSPENSION LIQUID IN POROUS MEDIUM

CROSS REFERENCE TO RELATED APPLICATIONS

This application claims priority to Chinese Application No. 201710387669.4, filed on May 27, 2017, entitled "method for simulation of microscopic flow of pre-crosslinked gel suspension liquid in porous medium", which is specifically and entirely incorporated by reference.

FIELD OF THE INVENTION

The present invention, which pertains to the cross-cutting fields of oil recovery enhancement, numerical reservoir simulation, and computational fluid dynamics in oil and gas field development, relates to methods for numerical simulation of microscopic flow of pre-crosslinked gel suspension liquid in a porous medium.

BACKGROUND OF THE INVENTION

Pre-crosslinked gel particle flooding is one of the emerging deep-displacement flooding technologies for further enhancing oil recovery in high-water-cut oilfields. However, the flow of pre-crosslinked gel suspension in porous medium is very complex. It not only has the basic seepage characteristics of rigid particle suspension, but also has the characteristics of elastic deformation and so on. At present, numerical reservoir simulation techniques that consider these characteristics are mostly based on classical percolation theory or size exclusion theory and fall into the category of macroscopic numerical simulation. Constrained by continuous medium hypothesis, it is impossible to simulate the real process of "migration, plugging, deformation, and remigration" of pre-crosslinked gel particles in porous medium.

To this end, the present invention proposes a method for simulation of the microscopic flow of a pre-crosslinked gel suspension in a porous medium taking into account the fine processing of the particle deformation, the simulation of the contact interaction between the particles and the efficient coupling between the particle and fluid, for in-depth understanding of the complex percolation mechanism of pre-crosslinked gel suspensions.

SUMMARY OF THE INVENTION

In order to make up for the deficiencies of the prior art, the present invention presents a method for simulation of a microscopic flow of pre-crosslinked gel suspension liquid in a porous medium, the pre-crosslinked gel suspension liquid containing one or more pre-crosslinked gel particles, the method comprises the steps of:

(1) establishing a simulation area of the porous medium based on a two-dimensional core CT slice image and subjecting the simulation area to numerical grid discretization;

(2) setting initial position and original shape of each of the one or more pre-crosslinked gel particles to generate virtual boundary mark points of the each of the one or more pre-crosslinked gel particles;

(3) marking type for numeric grid nodes in the simulation area subjected to the numerical grid discretization, the type including intra-particle node, particle boundary node, intra-fluid node, and fluid boundary node;

(4) calculating a force $F_f$ of fluid on each of the virtual boundary mark points according to momentum change of particle boundary nodes within a control range of the each virtual boundary mark point;

(5) calculating a contact force $F_p$ on each of the virtual boundary mark points using a particle contact action model;

(6) calculating a bending recovery force $F_b$ and a stretching recovery force $F_s$ for each of the virtual boundary mark points;

(7) calculating a velocity u and a displacement x of each of the virtual boundary mark point based on Newton's second law, the force $F_f$, the contact force $F_p$, the bending recovery force $F_b$ and the stretching recovery force $F_s$ of the each virtual boundary mark point, simulating movement of the each virtual boundary mark point according the velocity u and the displacement x thereof, and connecting respective virtual boundary mark points of the each of the one or more pre-crosslinked gel particles to obtain an overall shape and position of the each of the one or more pre-crosslinked gel particles as a simulation result; and (8) repeating the step (4) to the step (7) until a relative error of the last two simulation results is less than 0.01 or the number of iterations is greater than 100,000, and outputting the last simulation result.

Wherein the virtual boundary mark points in the step (2) are generated by discretizing a real curve boundary of the pre-crosslinked gel particle, the number of the virtual boundary mark points is 12, 18, or 24.

Wherein that in the step (3), the type for the numeric grid node is determined as follows: if the numerical grid node and its neighboring 8 nodes are covered by pre-crosslinked gel particle, then it is marked as the intra-particle node; if the numerical grid node is covered by the pre-crosslinked gel particle but there is uncovered neighbor node, then it is marked as the particle boundary node; if the numerical grid node and its neighboring 8 nodes are not covered by the pre-crosslinked gel particle, then it is marked as the intra-fluid node; if the numerical grid node is not covered by the pre-crosslinked gel particle but there is covered neighbor node, then it is marked as the fluid boundary node.

Wherein that in the step (4), the force of the fluid on each virtual boundary mark point is calculated according to the following formula:

$$F_f = \frac{(\Delta x)^2}{\Delta t} \sum_{k=1}^{p} \frac{V_s/V_t(\tau - 1/2)}{(1 - V_s/V_t) + (\tau - 1/2)} \sum_{j=0}^{8} C_j l_j$$

wherein $\Delta x$ represents a grid step size; $\Delta t$ represents a time step size; p represents the number the particle boundary nodes within the control range of the each virtual boundary mark point; $V_t$ represents a total volume of a control unit having a length of $\Delta x$ and centered on the particle boundary node; $V_s$ represents a volume of a portion of the control unit covered by the pre-crosslinked gel particle; $\tau$ represents relaxation time; $C_j$ represents an additional collision term; and $l_j$ represents a discrete velocity in a j direction.

Wherein that in the step (5), the contact force on the each of the virtual boundary mark points is calculated using a particle contact action model according to the following formula:

$$F_p = k\delta + \lambda \frac{d\delta}{dt}$$

wherein k represents a contact stiffness; λ represents a damping coefficient; and δ denotes an amount of contact overlap between virtual boundary mark points.

Wherein that in the step (6), the bending recovery force and the stretching recovery force for the each of the virtual boundary mark points are calculated according to the following formulas:

$$F_b = \gamma_b(\alpha - \alpha^0)$$

$$F_s = \gamma_s(l - l^0)$$

wherein $\alpha^0$ and $\alpha$ represent a vector angle between the each virtual boundary mark point and two adjacent virtual boundary mark points of the each virtual boundary mark point before and after deformation of the pre-crosslinked gel particle, respectively; $l^0$ and $l$ represent a distance between the each virtual boundary mark point and adjacent virtual boundary mark points of the each virtual boundary mark point before and after the deformation of the pre-crosslinked gel particle, respectively; $\gamma_b$ represents a bending recovery stiffness; and $\gamma_s$ represents a stretching recovery stiffness.

Wherein that in the step (7), the velocity and displacement of the each virtual boundary mark point are calculated according to the following formula:

$$u = u_{old} + \frac{F_f + F_p + F_b + F_s}{m/n} \Delta t$$

$$x = x_{old} + u \, \Delta t$$

wherein $u_{old}$ and u represent the velocity of the each virtual boundary mark point before and after the iteration, m represents a mass of the pre-crosslinked gel particle to which the each virtual boundary mark point belongs, n represents the number of virtual boundary mark points belonging to the pre-crosslinked gel particle, and $x_{old}$ and x represent the displacement of the each virtual boundary mark point before and after the iteration, respectively.

The present invention has the following beneficial effects and advantages:

According to the embodiments describe above, the method for simulation of microscopic flow of pre-crosslinked gel suspension liquid in a porous medium disclosed by the present invention can directly reflect the true deformation and migration process of the pre-crosslinked gel particles in the porous medium and can quantitatively characterize the microscopic percolation mechanism of pre-crosslinked gel suspension liquid in the porous medium. Therefore, the present invention provides an effective numerical simulation method for the study of the microscopic percolation mechanism of suspension liquids containing elastic particles, such as pre-crosslinked gel suspension liquid.

The method can process complex porous medium and has high fluid-solid coupling simulation accuracy. It can be used for simulation of microscopic percolation of suspension liquids containing elastic particles, such as pre-crosslinked gel suspension liquid.

DETAILED DESCRIPTION OF THE EMBODIMENTS

Figure 1:
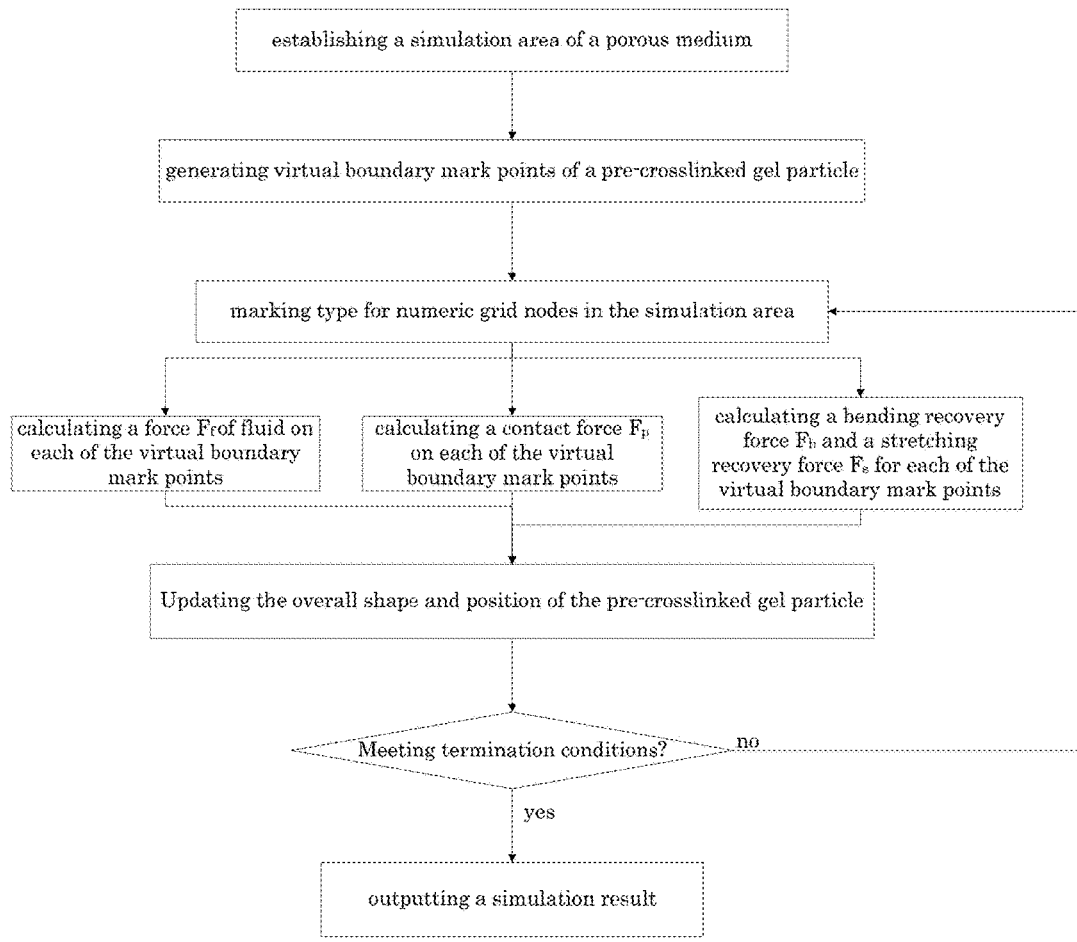
FIG. 1 is a flow chart of method for simulation of microscopic flow of pre-crosslinked gel suspension liquid in porous medium.

FIG. 1 shows detailed implementation of the present invention. The following further description will be made in conjunction with other drawings and specific embodiments to better understand the present invention, but does not limit the scope of the present invention.

Figure 2:
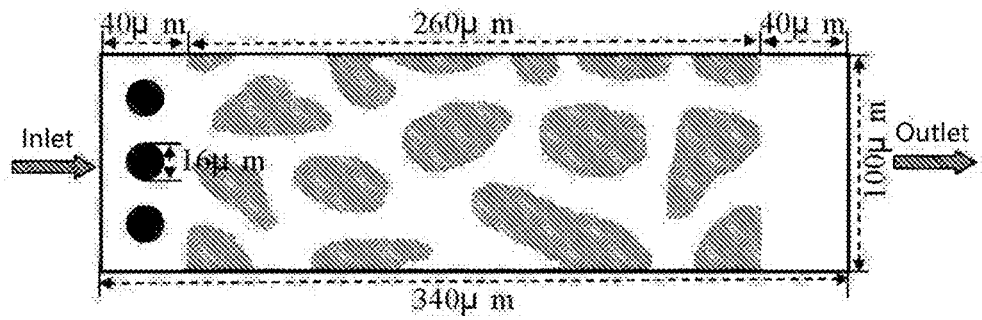
FIG. 2 is a schematic diagram of a simulation area of the porous medium.

(1) A simulation area of the porous medium is established based on a two-dimensional core CT slice image, as shown in FIG. 2. The length of the porous medium in the simulation area is 260 μm. To simulate the process of the pre-crosslinked gel particles entering and leaving the porous medium, pipes with a length of 40 μm are provided at the inlet and outlet ends of the porous medium respectively. Therefore, the simulation zone has a total length of 340 μm and a width of 100 μm. It is set that the grid step size is 0.2 μm, and the simulation area is subject to numerical grid discretization, there are 1,700×500=850,000 computing nodes.

(2) It is assumed that the initial position of the pre-crosslinked gel particles is at the inlet end of the porous medium, and the particles have an original circular shape with a diameter of 16 μm. The real curve boundaries of the particles are discretized to generate 18 virtual boundary mark points, and the polygon consisting of 18 link lines of the 18 virtual boundary mark points approximately represent the pre-crosslinked gel particles.

Figure 3:
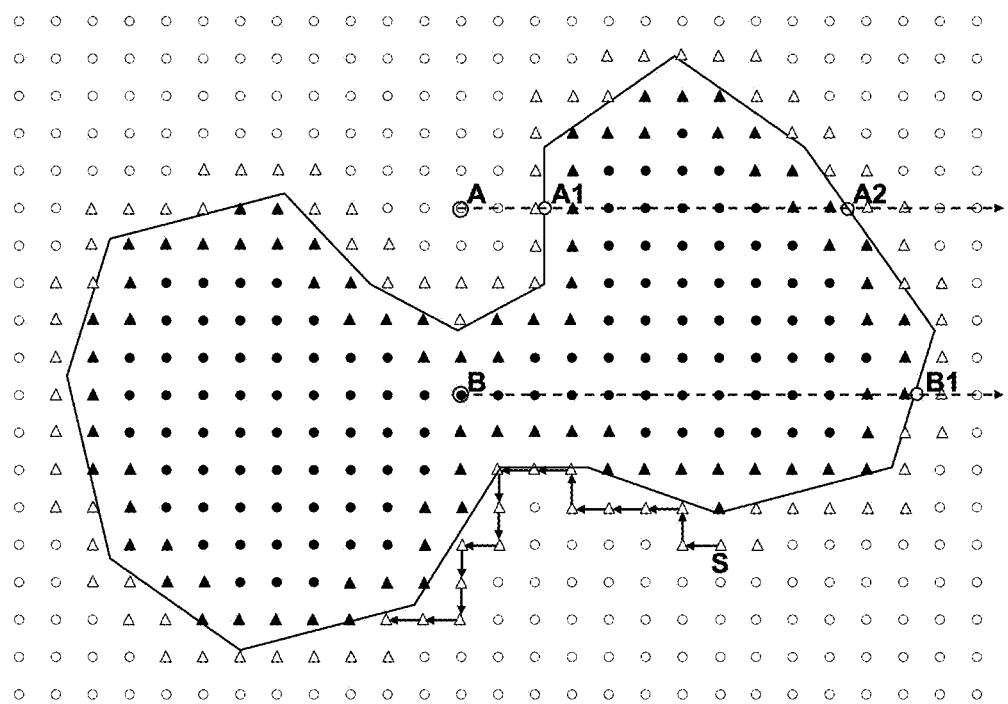
FIG. 3 is a schematic diagram of type markings of numerical grid nodes in the porous medium.

(3) The type of numeric grid node is marked. If a numerical grid node and its neighboring 8 nodes are covered by pre-crosslinked gel particles, then it is marked as an intra-particle node (indicated by the solid dot shown in FIG. 3). If a numerical grid node is covered by pre-crosslinked gel particles but there is uncovered neighbor node, then it is marked as a particle boundary node (indicated by the solid triangle shown in FIG. 3). If a numerical grid node and its neighboring 8 nodes are not covered by pre-crosslinked gel particles, then it is marked as an intra-fluid node (indicated by the hollow dot shown in FIG. 3). If a numerical grid node is not covered by pre-crosslinked gel particles but there is covered neighbor node, then it is marked as a fluid boundary node (indicated by the hollow triangle shown in FIG. 3). As shown in FIG. 3, the numerical grid node A is an intra-fluid node, B is an intra-particle node, and S is a fluid boundary node.

(4) With $\Delta x = 0.2$ μm, $\Delta t = 0.0025$ s and $\tau = 0.65$, the force of the fluid on each virtual boundary mark point is calculated according to the momentum change of the numerical grid nodes on the boundary of the pre-crosslinked gel particles by the following formula:

$$F_f = \frac{(\Delta x)^2}{\Delta t} \sum_{k=1}^{p} \frac{V_s/V_t(\tau - 1/2)}{(1 - V_s/V_t) + (\tau - 1/2)} \sum_{j=0}^{8} C_j l_j$$

wherein $\Delta x$ represents a grid step size; $\Delta t$ represents a time step size; p represents the number the particle boundary nodes within the control range of the each virtual boundary mark point; $V_t$ represents a total volume of a control unit having a length of $\Delta x$ and centered on the particle boundary node; $V_s$ represents a volume of a portion of the control unit covered by the pre-crosslinked gel particle; $\tau$ represents relaxation time; $C_j$ represents an additional collision term; $l_j$ and represents a discrete velocity in a j direction.

(5) The amount of contact overlap $\delta$ between virtual boundary mark points is calculated. With $k=10^4$ kg/s$^2$ and damping coefficient $\lambda=0.3$, the contact force on each virtual boundary mark point is calculated according to the following formula:

$$F_p = k\delta + \lambda \frac{d\delta}{dt}$$

wherein k represents a contact stiffness; $\lambda$ represents a damping coefficient; and $\delta$ denotes an amount of contact overlap between virtual boundary mark points.

(6) With $\gamma_b=10^2$ kg/s$^2$ and $\gamma_s=10$ kg/s$^2$, the bending recovery force and the stretching recovery force are calculated for each virtual boundary mark point based on the current shape and original shape of the pre-crosslinked gel particles according to the following formulas, respectively:

$$F_b = \gamma_b(\alpha - \alpha^0)$$

$$F_s = \gamma_s(l - l^0)$$

wherein $\alpha^0$ and $\alpha$ represent a vector angle between the each virtual boundary mark point and two adjacent virtual boundary mark points of the each virtual boundary mark point before and after deformation of the pre-crosslinked gel particle, respectively; $l^0$ and $l$ represent a distance between the each virtual boundary mark point and adjacent virtual boundary mark points of the each virtual boundary mark point before and after the deformation of the pre-crosslinked gel particle, respectively; $\gamma_b$ represents a bending recovery stiffness; and $\gamma_s$ represents a stretching recovery stiffness.

(7) Based on Newton's second law, the velocity u and displacement x of each virtual boundary mark point are calculated according to the following formulas, respectively, and the respective virtual boundary mark points are connected to obtain the overall shape and position of the pre-crosslinked gel particles.

$$u = u_{old} + \frac{F_f + F_p + F_b + F_s}{m/n} \Delta t$$

$$x = x_{old} + u \, \Delta t$$

wherein $u_{old}$ and u represent the velocity of the each virtual boundary mark point before and after the iteration, m represents a mass of the pre-crosslinked gel particle to which the each virtual boundary mark point belongs, n represents the number of virtual boundary mark points belonging to the pre-crosslinked gel particle, and $x_{old}$ and x represent the displacement of the each virtual boundary mark point before and after the iteration, respectively.

Figure 4:
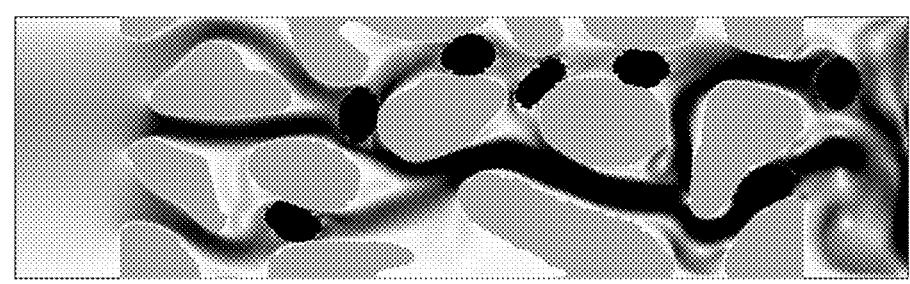
FIG. 4 is a schematic diagram illustrating the simulation result of microscopic flow of pre-crosslinked gel suspension liquid in porous medium.

(8) Step (4) to step (7) are repeated. When the relative error of the last two simulation results is less than 0.01 or the number of iterations is greater than 100,000, the simulation process is ended and a simulation result is output, as shown in FIG. 4.

According to the embodiments describe above, the method for simulation of microscopic flow of pre-crosslinked gel suspension liquid in a porous medium disclosed by the present invention can directly reflect the true deformation and migration process of the pre-crosslinked gel particles in the porous medium and can quantitatively characterize the microscopic percolation mechanism of pre-crosslinked gel suspension liquid in the porous medium. Therefore, the present invention provides an effective numerical simulation method for the study of the microscopic percolation mechanism of suspension liquids containing elastic particles, such as pre-crosslinked gel suspension liquid.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features of the technical solutions, as long as these modifications or substitutions do not cause the essence of corresponding technical solutions to depart from the spirit and scope of the technical solutions in the embodiments of the present invention.

The invention claimed is:

1. A computer-implemented method for simulation of a microscopic flow of pre-crosslinked gel suspension liquid in a porous medium, the pre-crosslinked gel suspension liquid containing one or more pre-crosslinked gel particles, the method comprises the steps of:
   (1) using a processor to generate a simulation area of the porous medium based on a computer-readable two-dimensional core CT slice image and subjecting the simulation area to numerical grid discretization, such that the simulation area has a finite number of computing numeric grid nodes;
   (2) setting initial position and original shape of each of the one or more pre-crosslinked gel particles to generate virtual boundary mark points of the each of the one or more pre-crosslinked gel particles;
   (3) marking type for numeric grid nodes in the simulation area subjected to the numerical grid discretization, the type including intra-particle node, particle boundary node, intra-fluid node, and fluid boundary node;
   (4) calculating a force $F_f$ of fluid on each of the virtual boundary mark points according to momentum change of particle boundary nodes within a control range of each virtual boundary mark point, wherein the force of fluid on each virtual boundary mark point is calculated according to the following formula:

$$F_f = \frac{(\Delta x)^2}{\Delta t} \sum_{k=1}^{p} \frac{V_s/V_t(\tau - 1/2)}{(1 - V_s/V_t) + (\tau - 1/2)} \sum_{j=0}^{8} C_j l_j$$

wherein Δx represents a grid step size; Δt represents a time step size; p represents a number of particle boundary nodes within control range of the each virtual boundary mark point; $V_t$ represents a total volume of a control unit having a length of Δx and centered on the particle boundary node; $V_s$ represents a volume of a portion of the control unit covered by the pre-crosslinked gel particle; τ represents relaxation time; $C_j$ represents an additional collision term; and $l_j$ represents a discrete velocity in a j direction;

(5) calculating a contact force $F_p$ on each of the virtual boundary mark points using a particle contact action model;

(6) calculating a bending recovery force $F_b$ and a stretching recovery force $F_s$ for each of the virtual boundary mark points;

(7) calculating a velocity u and a displacement x of each of the virtual boundary mark point based on Newton's second law, the force $F_f$, the contact force $F_p$, the bending recovery force $F_b$ and the stretching recovery force $F_s$ of the each virtual boundary mark point, simulating movement of the each virtual boundary mark point according the velocity u and the displacement x thereof, and connecting respective virtual boundary mark points of the each of the one or more pre-crosslinked gel particles to obtain an overall shape and position of the each of the one or more pre-crosslinked gel particles as a simulation result;

(8) repeating steps (4) to (7) and calculating a relative error of the two most recent simulation results therefrom until the relative error is less than 0.01 or a number of repetition iterations is greater than 100,000; and (9) outputting the most recent simulation result.

2. The method for simulation of the microscopic flow of pre-crosslinked gel suspension liquid in the porous medium according to claim 1, wherein the virtual boundary mark points in the step (2) are generated by discretizing a real curve boundary of the pre-crosslinked gel particle, the number of the virtual boundary mark points is 12, 18, or 24.

3. The method for simulation of a microscopic flow of pre-crosslinked gel suspension liquid in a porous medium according to claim 1, wherein that in the step (3), the type for the numeric grid node is determined as follows: if the numerical grid node and its neighboring 8 nodes are covered by pre-crosslinked gel particle, then it is marked as the intra-particle node; if the numerical grid node is covered by the pre-crosslinked gel particle but there is uncovered neighbor node, then it is marked as the particle boundary node; if the numerical grid node and its neighboring 8 nodes are not covered by the pre-crosslinked gel particle, then it is marked as the intra-fluid node; if the numerical grid node is not covered by the pre-crosslinked gel particle but there is covered neighbor node, then it is marked as the fluid boundary node.

4. The method for simulation of a microscopic flow of pre-crosslinked gel suspension liquid in a porous medium according to claim 1, wherein that in the step (5), the contact force on the each of the virtual boundary mark points is calculated using a particle contact action model according to the following formula:

$$F_p = k\delta + \lambda \frac{d\delta}{dt}$$

wherein k represents a contact stiffness; λ represents a damping coefficient; and α denotes an amount of contact overlap between virtual boundary mark points.

5. The method for simulation of a microscopic flow of pre-crosslinked gel suspension liquid in a porous medium according to claim 1, wherein that in the step (6), the bending recovery force and the stretching recovery force for the each of the virtual boundary mark points are calculated according to the following formulas:

$$F_b = \gamma_b(\alpha - \alpha^0)$$

$$F_s = \gamma_s(l - l^0)$$

wherein $a\alpha^0$ and α represent a vector angle between the each virtual boundary mark point and two adjacent virtual boundary mark points of the each virtual boundary mark point before and after deformation of the pre-crosslinked gel particle, respectively; $l^0$ and l represent a distance between the each virtual boundary mark point and adjacent virtual boundary mark points of the each virtual boundary mark point before and after the deformation of the pre-crosslinked gel particle, respectively; $\gamma_b$ represents a bending recovery stiffness; and $\gamma_s$ represents a stretching recovery stiffness.

6. The method for simulation of a microscopic flow of pre-crosslinked gel suspension liquid in a porous medium according to claim 1, wherein that in the step (7), the velocity and displacement of the each virtual boundary mark point are calculated according to the following formula:

$$u = u_{old} + \frac{F_f + F_p + F_b + F_s}{m/n}\Delta t$$

$$x = x_{old} + u\,\Delta t$$

wherein $u_{old}$ and u represent the velocity of the each virtual boundary mark point before and after the iteration, m represents a mass of the pre-crosslinked gel particle to which the each virtual boundary mark point belongs, n represents the number of virtual boundary mark points belonging to the pre-crosslinked gel particle, and $x_{old}$ and x represent the displacement of the each virtual boundary mark point before and after the iteration, respectively.

* * * * *